May 30, 1967  C. J. CHARSKE  3,323,105
DIGITAL RECORDATION AND PLAYBACK OF SEISMIC SIGNALS
Filed Nov. 5, 1964  2 Sheets-Sheet 1

INVENTOR.
CHARLES J. CHARSKE,
BY John B. Davidson
ATTORNEY.

May 30, 1967   C. J. CHARSKE   3,323,105
DIGITAL RECORDATION AND PLAYBACK OF SEISMIC SIGNALS
Filed Nov. 5, 1964   2 Sheets-Sheet 2

INVENTOR.
CHARLES J. CHARSKE
BY John B. Davidson
ATTORNEY.

3,323,105
DIGITAL RECORDATION AND PLAYBACK OF SEISMIC SIGNALS
Charles J. Charske, Houston, Tex., assignor, by mesne assignments, to Esso Production Research Company, Houston, Tex., a corporation of Delaware
Filed Nov. 5, 1964, Ser. No. 409,098
2 Claims. (Cl. 340—15.5)

This invention relates generally to the digital recording and playback of seismic signals, and more particularly to apparatus for viewing seismic signals in the field to insure that they are being properly recorded in digital form.

For a number of reasons, the digital recording of seismic signals has become increasingly popular in recent years. For example, it is possible to record seismic signals over a very wide dynamic range, far greater than is possible with conventional analog recording systems. Furthermore, the use of digital recording makes possible the utilization of digital computers for correlating the traces of the seismogram thus produced.

One drawback of digital recordation of seismic data is that it is difficult for an operator to quickly verify that the data definitely is being recorded in suitable form. This disadvantage is particularly troublesome when the data is being recorded on magnetic tape. The present invention is suitable for use with a system for obtaining seismic data in digital form comprising a multiplexing unit for converting a multiplicity of electrical seismic analog signals into a single electrical analog signal containing seismic intelligence, an analog-to-digital conversion means for converting the single analog signal in multiplexed form into binary-coded digital data, and recording means for recording the single analog signal in reproduction form. Preferably, the multiplexing means includes a sequencing control unit for producing a plurality of binary-coded digital electrical signals responsive to an actuating pulse applied thereto, for switching the multiplexing unit for the purpose of sampling the seismic analog signals in sequence. A storage oscilloscope is utilized having vertical beam deflection means and horizontal beam deflecting means for the purpose of writing or scanning the face of the oscilloscope to semipermanently store information or data thereon. Scanning means is connected to the horizontal deflection means for horizontally deflecting the beam across the face of the oscilloscope at a constant time rate responsive to an actuating pulse applied thereto. For the purpose of controlling the vertical deflection of the beam of the storage oscilloscope there is provided a stair-step signal generator for producing a stair-step waveform output voltage responsive to an electrical activating pulse in synchronism with the sequential sampling of the seismic signals by the multiplexing unit, and for adding to the stair-step signal the seismic signal being sampled by the multiplexing unit at that moment. Means connected to the stair-step signal generator and to the beam deflecting means is provided for supplying an activating pulse thereto just prior to the initial sampling cycle of the multiplexing unit. At each step of the stair-step generator, a blanking pulse is produced and supplied to the storage oscilloscope for the purpose of cutting off the electron beam to prevent the stair-step generator from producing undesired transient signals on the oscilloscope viewing screen. Thus, each sample of the multiplexed signal will appear at a different vertical position on the oscilloscope screen. Since the multiplexing operation is extremely rapid, there will be produced from the oscilloscope screen a plurality of traces corresponding to and substantially identical to the plurality of multiplexed traces.

Objects and features of the invention not apparent from the foregoing discussion will become evident upon consideration of the following detailed description thereof when taken in connection with the accompanying drawings, wherein.

Figure 2:
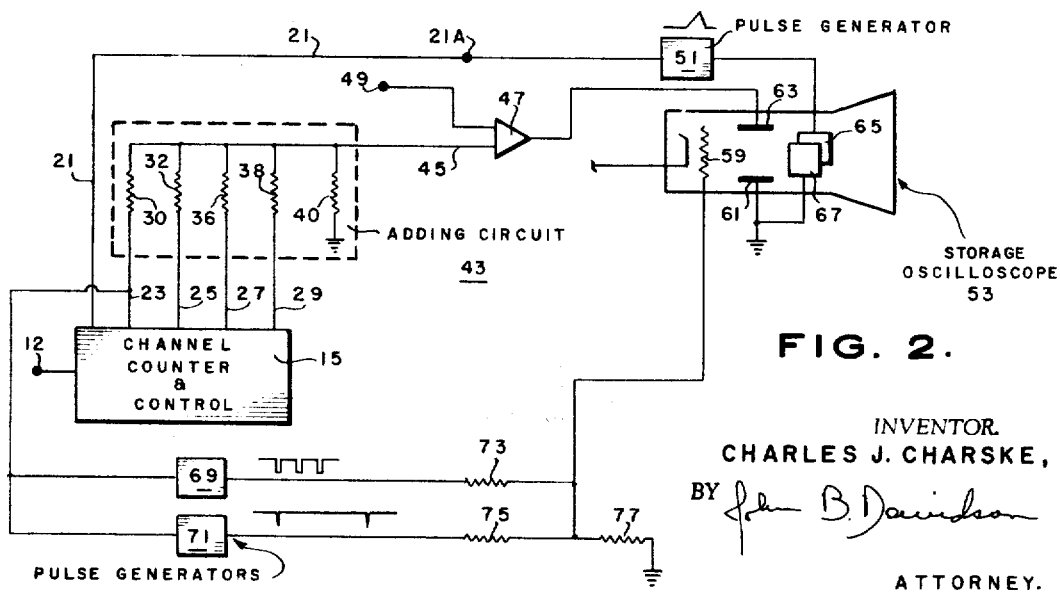
FIG. 2 is a schematic diagram of a portion of the apparatus of FIG. 1.
Figure 4:
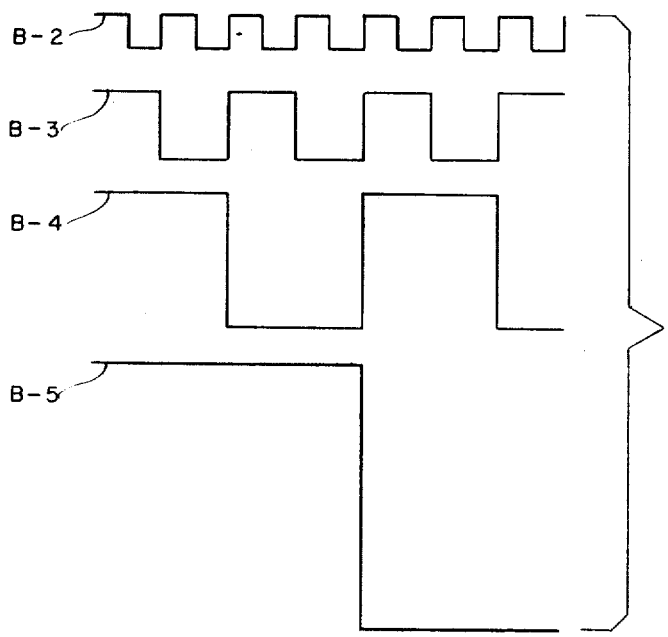
Figure 5:
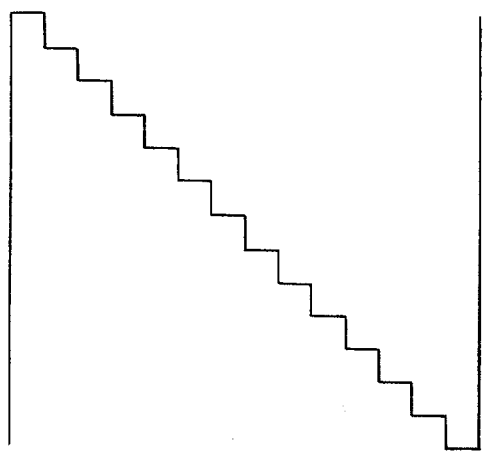

FIG. 4 is a waveform representation of currents flowing through resistors 30, 32, 36, and 38 in the circuit of FIG. 2; and FIG. 5 is a waveform of a stair-step voltage produced by adding circuit 43 of FIG. 2.

Figure 1:
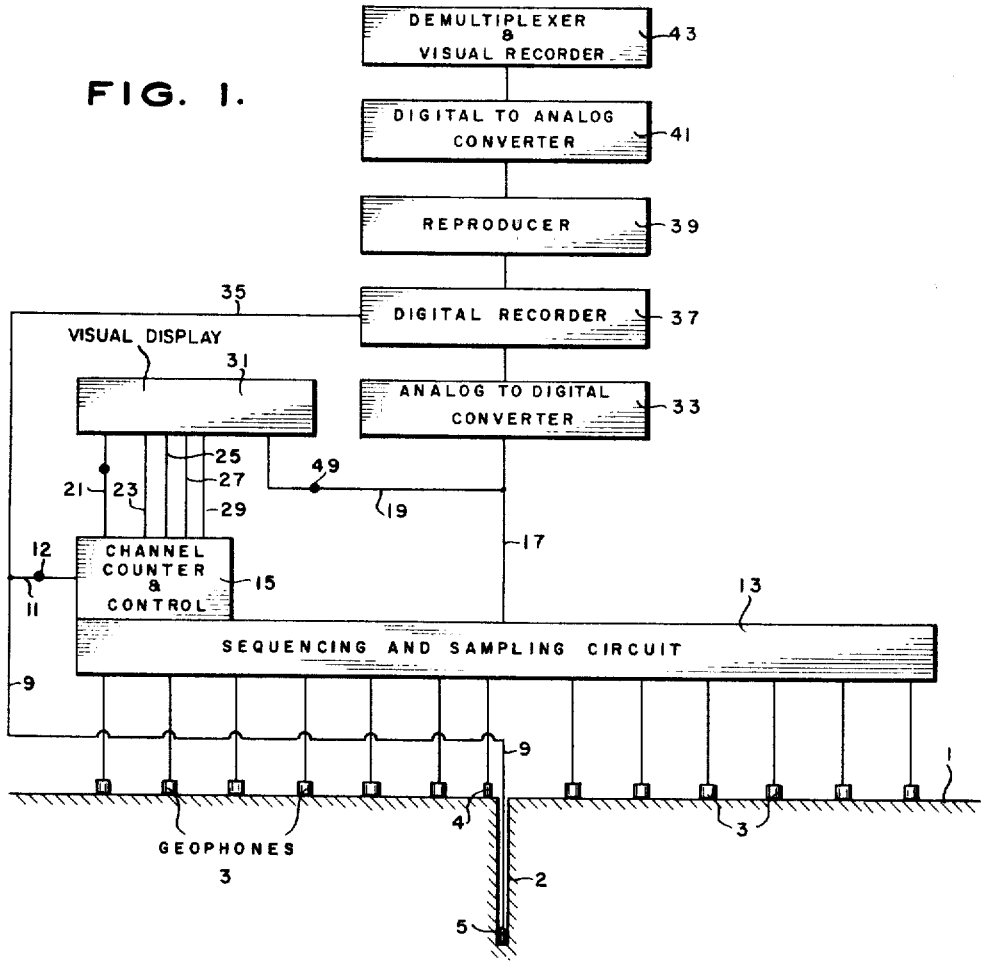
FIG. 1 is a schematic representation of apparatus for performing a seismic invention and digitally recording and reproducing seismic analog signals in accordance with the invention.
Figure 3:
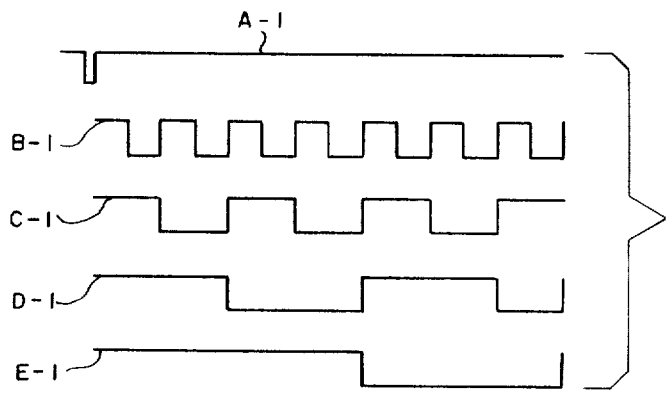
FIG. 3 is a waveform representation of four voltages appearing in the circuit of FIG. 1.

With reference now to FIG. 1, there is illustrated an apparatus for performing a seismic observation on the earth's surface 1, including a plurality of reflection geophones 3 disposed in a liner array on both sides of shot hole 2. A so-called TSP geophone 4 is positioned at the top of the shot hole for the purpose of measuring the travel time of seismic waves produced by explosive charge 5 from the location of charge 5 to the earth's surface. The reflection geophones 3 and the TSP geophone 4 are electrically connected to a sequencing and sampling circuit 13, the function of which is to convert the plurality of electrical seismic signals produced by geophones 3, 4 into a single corresponding electrical analog signal containing seismic intelligence. Preferably, each sequencing operation is performed between 200 to 4000 times each second, depending on the maximum frequency component of interest in the analog signal. The sequencing and sampling apparatus 13 is under the control of a channel counter and control apparatus 15, the function of which is to switch the sampling apparatus from one to the other of the electrical circuits connected to the individual geophones 3, 4 and to connect such circuits to the line 17 leading to the analog-to-digital converter 33. The channel counter and the control circuit 15 preferably produces a plurality of binary-coded digital electrical signals such as shown in FIG. 3 for the purpose of controlling the circuits of sequencer and sampler 13. Time signals produced by the channel counter and control circuit 15, or by the sequencer and sampler 13, may be transmitted to the analog-to-digital converter 33 either on line 17 or on a separate line (not shown) leading from sequencer and sampler unit 13 to analog-to-digital converter 33. The output signals from the analog-to-digital converter 33 are transmitted to digital recorder 37 and recorded thereby. Time signals either may be recorded along with the digital coded seismic information after or before each sampling sequence of such signals, or may be transmitted from analog-to-digital converter 33 to digital recorder 37 on a separate line (not shown) and recorded on a separate track adjacent the track on which seismic information is recorded so that the time relationship of each bit of seismic information can be referenced to the occurrence time of the seismic disturbance responsible for the seismic information. When a separate track is used, the time signals may be in the form of clock pulses. Alternatively, when the time information is injected into the same track of the digital recorder 37 on which the seismic information is being recorded, the time information may be in the form of binary-coded digital time words. Preferably, the digital recorder 37 is of the type utilizing a magnetic tape as the recording medium.

The digitally recorded seismic information and time information are reproduced in digital form by a reproducing device 39, which in some instances may be the same as the digital recorder 37, provided that the digital recorder is provided with suitable reproducing heads. The digital information reproduced by the reproducer 39 is transmitted to a digital-to-analog converter 41 whereat the digital signals are converted to analog form. The analog signals are transmitted to unit 43 whereat they are demultiplexed into electrical analog signals and recorded in visible form. The recorder portion of unit 43 may be a conventional recorder for recording seismic information in variable density, variable area, or wiggly trace form to form a seismogram, the traces of which can be correlated in the usual manner. Alternatively, the digital reproducer 39 can feed a computer capable of accepting the digital information reproduced thereby and performing correlations thereon to produce correlograms from which geologic information can be gathered.

The sequencing and sampling apparatus, channel counting and control apparatus, the digital-to-analog and analog-to-digital converters, and the various recorders and reproducers described above can be any of a number of apparatuses well known to the prior art. Suitable components, for example, are manufactured by the Packard-Bell Corporation of Los Angeles, Calif., the Ampex Corporation of Los Angeles, Calif., and the Texas Instruments Company of Dallas, Tex. Furthermore, a complete system such as described above is set forth in detail in U.S. Patent 3,134,957—R. S. Foote et al.

As indicated above, the channel counter and control circuit 15 is adapted to generate a plurality of binary-coded waveforms such as illustrated in FIG. 3, responsive to an input pulse applied thereto which may be produced by closure of a switch on digital recorder 37 for the purpose of energizing lines 35 and 9 to detonate explosive charge 5 and produce a seismic disturbance. Line 35 is connected to line 11 to conduct the electrical pulse produced thereby to the channel counter and control circuit 15, whereat a sharp, negative going pulse is generated substantially at the instant that explosive charge 5 is detonated. The channel counter and control unit 15 may assume many configurations such as a ring counter or a signal generator Model D1 produced by the Packard-Bell Corporation of Santa Ana, Calif. Such apparatuses produce a plurality of output signals which are indicative of digital numbers. For example, signals having the waveforms B–1, C–1, D–1, and E–1 are respectively indicative of the digits of binary numbers so that the composite of the particular waveforms shown in FIG. 3 are sequentially indicative of each of the binary numbers between 0000 and 1110 (corresponding to the digital numbers 0 and 14). The signals function to switch the sequencing and sampling apparatus 13 to each of 14 data channels in sequence (corresponding to the various lines from the geophones 3, 4, and a clock signal, which may be a part of the channel counter and control circuit 15 or of the sequencer and sampler circuit 17).

Reference is made to Patent 3,134,957 for the purpose of a detailed description of apparatus such as described above and illustrated in FIG. 1.

The output signals of channel counter and control circuit 15 appear on lines 21, 23, 25, 27, and 29 and correspond to the signals illustrated in FIG. 3 and designated A–1, B–1, C–1, D–1, and E–1. The analog signal from sequencer and sampler apparatus 13 appearing on line 17 is applied to apparatus 31 via line 19. The function of apparatus 31 is to immediately display in visual form as a plurality of traces corresponding to the signals at the outputs of geophones 3, 4, the multiplexed signals appearing on line 17 so that the operator can be sure that the signals applied to digital-to-analog converter 33 and digital recorder 37 are in proper form for digital recordation.

FIG. 2 is a schematic diagram in more detailed form of the apparatus 31 illustrating preferred embodiment of the apparatus. The apparatus includes a stair-step generator including the output channels of channel counter and control apparatus 15 and an adding circuit 42, a storage oscilloscope 53, a circuit 47 which may be of the differential amplifier type for combining the analog output signal of sequencer and sampler circuit 13 appearing at terminal means 49, and the signal appearing on line 45 for the purpose of controlling the beam of the storage oscilloscope so that the combination of the output signals of the stair-step generator and the multiplexed analog signals can be suitably displayed on the storage oscilloscope. Pulse generators 69, 71, and 51 all produce different output waveforms but the operations of the generators are synchronized. Pulse generator 71 produces very sharp, negative-going pulses at predetermined time intervals, such as 1 milliesecond or 10 milliseconds, to provide time marks on the X axis of the oscilloscope face. Pulse generator 69 produces substantially rectangular wave pulses in synchronism with the stairsteps of the stair-step generator. Pulse generator 69 produces sharp, negative-going pulses for the purpose of blanking the oscilloscope in synchronism with the changes in voltage level of the stair-step generator output so as to mask transients produced by the stair-step generator on the oscilloscope face. The function of pulse generator 51 is to produce a triangular pulse for sweeping the oscilloscope beam horizontally across the face of the oscilloscope, the triangular pulse being initiated substantially concomitant with or just before initiation of the first stair-step output signal by the stair-step generator responsive to a pulse applied to terminal 12. The input circuit of the triangular wave generator 51 is connected to terminal 21A in lead 21 from the channel counter and control circuit 15 so that the pulse A1 (see FIG. 3) is the pulse that initiates the production of a triangular wave pulse from generator 51. The output of triangular wave generator 51 is applied to horizontal deflection plates 65 and 67, plate 67 being shown as having been grounded.

The output circuit of adding circuit 47 is connected between vertical deflection plates 63 and 61, plate 61 being shown as having been grounded. The output signals of pulse generating circuits 69 and 71 are added together by an adding circuit including resistors 73, 75 and 77, the output of which is connected to the control grid 59 of storage oscilloscope 53 so as to control the intensity of the beam passing through the deflection plates to the screen of the oscilloscope. Both of the pulse generating circuits 69 and 71 are actuated by pulses from output line 23 of channel counter and control circuit 15. The actuating pulses appearing on line 23 have been designated as B–1 in FIG. 3. Pulse generating circuit 69 produces a pulse with every change in voltage level of the voltage appearing on line 23, while pulse generating circuit 71 functions also as a counter and produces a pulse only after a predetermined number of changes in the voltage level of the signal appearing on line 23.

The manner in which the channel counter and control circuit 15 and the adding circuit 43 produce an output voltage on line 45 having the stair-step waveform illustrated in FIG. 5 will be best understood by considering the waveforms in FIGS. 3, 4, and 5. Let it be assumed that the signals appearing on output lines 21, 23, 25, 27, and 29 correspond to the waveforms A–1, B–1, C–1, D–1, and E–1, respectively, of FIG. 3, the amplitudes of the signals being equal, as shown. The resistance of resistor 36 is approximately twice that of resistor 38, the resistance of resistor 32 is approximately twice that of resistor 36, and the resistance of resistor 30 is approximately twice that of resistor 32. Therefore, the amplitudes of the currents flowing through the resistors in adding circuit 43 will be substantially as shown in FIG. 4. The sum of the currents flowing through resistors 30, 32, 36, and 38 (i.e., the current flowing through resistor 40), will be substantially as shown in FIG. 5. Therefore, the voltage waveform appearing across resistor 40 will have the same waveform.

The manner in which the values of the resistors 30, 32, 36, and 38 are determined also may be expressed as follows. If the resistance of resistor 38 (through which passes the signal representative of the binary exponential $2^N$) is R, then the resistance of a resistor connected to a signal representative of the exponential $2^K$ (where the exponent K is less than N, the total number of signals being $N+1$) is $R(N-K)$.

It should be noted that resistor 40 should have a low resistance compared to the lowest resistance of resistors 30, 32, 36, and 38, and that the input impedance of circuit 47 should be high relative to the resistance of the one of resistors 30, 32, 36, and 38 having the highest resistance.

The amplitude of the signal applied to terminal 49 to be added with the stair-step signal appearing on line 45 by circuit 47 should be approximately equal to the amplitude of the output signal on line 23 and should never be greater than about 150% of the amplitude of this output signal. The reason for this will become apparent below. The over-all operation of the apparatus shown in FIGS. 1 and 2 is as follows. Let it be assumed that digital recorder 37 produces an output pulse on lines 35, 11, and 9 as by closing a switch in an electrical circuit at the beginning of a recording interval thereof. This pulse is effective to detonate explosive charge 5 to produce seismic waves which are subsequently detected by geophones 3, 4. The pulse is also applied to channel counter and control circuit 15 to produce electrical signals having the waveform shown in FIG. 3 on lines 21, 23, 25, 27, and 29, and to commence the sequencing and sampling operation of apparatus 13 whereby a multiplexed signal will appear on line 17 containing seismic information comprising amplitude samples of all of the geophone output signals at periodic intervals determined by Shannon's Theorem. The pulse appearing in waveform A–1 is applied to triangular wave generator 51 to begin a single horizontal deflection of the beam of the storage ocilloscope 53. The stair-step signal appearing on line 45 and the multiplexed signal appearing at terminal 49 are added together by circuit 47 to vertically deflect the beam. Blanking pulses appear on control grid 59 whenever the stair-step signal steps to a new voltage so that no transients appear on the screen of the oscilloscope. Thus, instead of one continuous trace being produced on the screen of the oscilloscope, there will be produced a number of discrete points at various vertical positions thereon determined by the sum of the stair-step signal and the multiplexed signal. Inasmuch as the stair-step waveform cycles at a very high repetition rate, the individual points on the oscilloscope face will merge to produce a plurality of substantially horizontal traces equal in number to the number of steps in the output signal of the stair-step generator. The ultimate result will be a seismogram similar to a conventional wiggly-trace seismogram produced on the face of the storage oscilloscope for viewing by the operator.

Manifestly, concomitantly with the operation described immediately above, the multiplexed signal appearing on line 17 will be applied to analog-to-digital converter 33, and the output signals of the converter will be recorded by digital recorder 37. When the digital recorder 37 also comprises the reproducer 39, as by the provision of reproducing heads on the recorder, the recorded signals can be immediately reproduced and applied to digital-to-analog converter 41. The fidelity of reproduction can be determined by deflecting the beam of the storage oscilloscope slightly, as by applying a slight biasing voltage to either the horizontal deflection plates or the vertical deflection plates thereof, and connecting terminal 49 to the output of the digital-to-analog converter 41. The operation described immediately above can be performed again (without the detonation of explosive charge 5, of course) so that there will appear on the screen of the oscilloscope either vertically or horizontally displaced therefrom by a slight distance, another seismogram which should correspond exactly to the seismogram previously obtained if the fidelity of recordation and reproduction is very good. However, should there be some malfunction in the recording and reproducing equipment, this fact will become immediately apparent so that the fault can be repaired and another seismic observation performed.

The timing marks produced by pulse generator 71 can be eliminated when the oscilloscope is provided with a graticule. However, the use of timing marks produced by a pulse generator is preferred. The timing marks produced by pulse generator 71 appear as "blank" vertical lines on the oscilloscope face.

While there has been shown and described what at present is considered to be the preferred embodiment of the present invention, other modifications will be apparent to those skilled in the art which do not depart from the scope of the broadest aspects of the invention.

What is claimed is:

1. In a system for obtaining digital seismic data comprising a multiplexing sequencer and sampling circuit for converting a multiplicity of electrical seismic analog signals into a single electrical analog signal containing seismic intelligence, analog-to-digital conversion means for converting the single analog signal into binary-coded digital data, and recording means for recording said converted single analog signal in reproducible form, said multiplexing sequencer including a sequencing control unit for producing a plurality of binary-coded, rectangular wave digital electrical signals responsive to an actuating electrical pulse, for repetitively switching said multiplexing unit to sample said seismic analog signals in sequence, the improvement comprising:

an adding and weighting circuit for adding together said binary-coded electrical signals to produce a stair-step output signal;

a storage oscilloscope having vertical beam deflection means and horizontal beam deflection means;

means adding together the output signal of said multiplexing sequencer and the stair-step output signal of said adding and weighting circuit and applying the summed signal to the vertical deflection means of said oscilloscope to vertically deflect the oscilloscope beam;

triangular wave generating means connected to said horizontal deflection means to horizontally deflect said beam at a predetermined time rate responsive to an electrical pulse applied thereto; and means connected to said triangular wave generating means for producing an electrical pulse for simultaneously actuating said triangular wave generating means and said sequencing control unit.

2. In a system for obtaining digital seismic data comprising a multiplexing sequencer and sampling circuit for converting a multiplicity of electrical seismic analog signals into a single electrical analog signal containing seismic intelligence, analog-to-digital conversion means for converting the single analog signal into binary-coded digital data, and recording means for recording said converted single analog signal in reproducible form, said multiplexing sequencer including a sequencing control unit for producing a plurality of binary-coded, rectangular wave digital electrical signals beginning at a reference time responsive to an actuating electrical pulse, for repetitively switching said multiplexing sequencer to sample said seismic analog signals in sequence, the improvement comprising:

a stair-step signal generator for producing a stair-step waveform output voltage responsive to an actuating pulse;

a storage oscilloscope having vertical beam deflection means and horizontal deflection means;

means connected to said horizontal beam deflection means for adding together the output signals of said stair-step signal generator and said multiplexing sequencer and applying the summed signal to the vertical beam deflection means of said oscilloscope;

beam deflection circuit means connected to said horizontal beam deflection means for horizontally deflecting said beam across the face of said oscilloscope at a constant time rate responsive to an actuating pulse applied thereto; and means connected to said stair-step signal generator and to said beam deflection circuit means for producing an actuating pulse therefor at said reference time.

References Cited

UNITED STATES PATENTS 2,858,475  10/1958  Blake _____ 340—15.5 X
3,134,957   5/1964  Foote et al. _____ 340—15.5
3,158,433  11/1964  Alexander et al. ___ 340—15.5 X BENJAMIN A. BORCHELT, *Primary Examiner.*

M. F. HUBLER, *Assistant Examiner.*